(12) United States Patent
Higashino

(10) Patent No.: US 6,267,528 B1
(45) Date of Patent: Jul. 31, 2001

(54) COUPLING STRUCTURE OF VARIABLE LENGTH SHAFT

(75) Inventor: Kiyoharu Higashino, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/345,955

(22) Filed: Jul. 1, 1999

(30) Foreign Application Priority Data

Jul. 13, 1998 (JP) .................................................. 10-212029
Mar. 24, 1999 (JP) .................................................. 11-079040

(51) Int. Cl.⁷ ...................................................... F16B 2/18
(52) U.S. Cl. .................................. 403/359.5; 403/374.5; 403/359.2; 74/492; 280/775
(58) Field of Search ............................. 403/359.1, 359.2, 403/359.3, 359.4, 359.5, 374.5, 322.4; 74/492, 493; 280/777, 775; 464/162, 179

(56) References Cited

U.S. PATENT DOCUMENTS

| | | | | |
|---|---|---|---|---|
| 3,179,450 | * | 4/1965 | Recker | 403/359.5 X |
| 4,728,218 | * | 3/1988 | Durham | 403/359.5 X |
| 5,006,007 | * | 4/1991 | Fischer et al. | 403/359.5 X |
| 5,013,177 | * | 5/1991 | Sol | 403/374.5 X |
| 5,562,307 | * | 10/1996 | Conner | 280/777 |
| 5,707,167 | * | 1/1998 | Battocchio | 403/374.5 X |
| 5,732,600 | * | 3/1998 | Peterson et al. | 74/492 |
| 5,816,113 | * | 10/1998 | Fohl | 403/359.5 X |
| 6,105,456 | * | 8/2000 | Higashino et al. | 74/492 |

FOREIGN PATENT DOCUMENTS

| | | |
|---|---|---|
| 63-17862 | 5/1988 | (JP) . |
| 2-44609 | 11/1990 | (JP) . |
| 4-131578 | 12/1992 | (JP) . |

* cited by examiner

Primary Examiner—Harry C. Kim
(74) Attorney, Agent, or Firm—Miles & Stockbridge P.C.

(57) ABSTRACT

A coupling structure of a variable length shaft, comprises a pipe member having an end formed with a plurality of slits elongated in the axial direction to be capable of expanding and diminishing in diameter, an intermediate shaft spline-fitted in the end of the pipe member, and a ring member fitted on an outer periphery of the end of the pipe member, the intermediate shaft being fastened by the end of the pipe member. A holder is releasably attached to an end of the ring member to expand a diameter thereof and thereby reduce a slide frictional resistance of the pipe member against the intermediate shaft. When the holder is released, the ring member diminishes in diameter, and a fastening force of the pipe member on the intermediate shaft is increased.

6 Claims, 10 Drawing Sheets

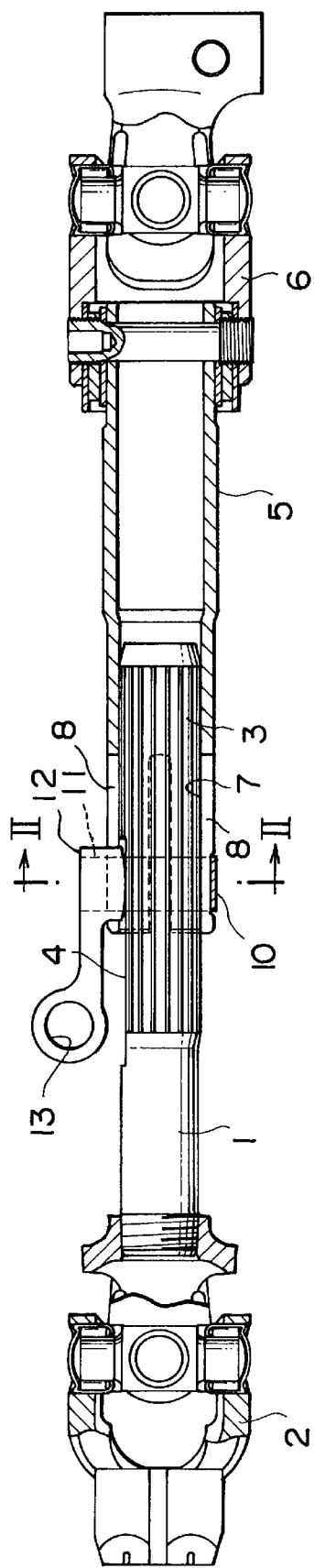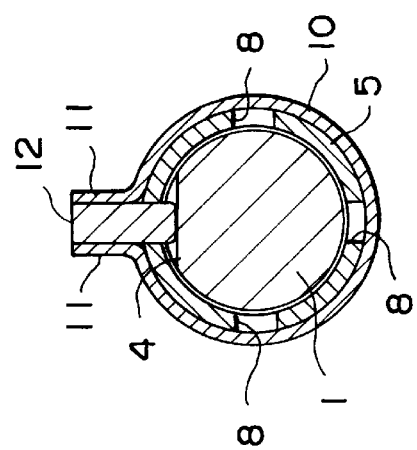
FIG. 1
FIG. 2

FIG. 15A
FIG. 15B
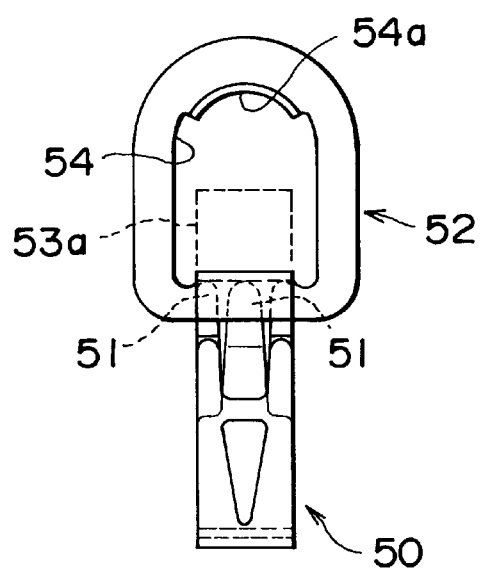
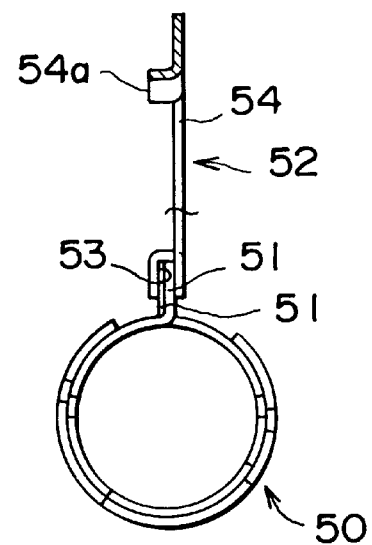

COUPLING STRUCTURE OF VARIABLE LENGTH SHAFT

This application claims the benefit of Japanese Patent Applications No. 10-212029 and 11-79040 which are hereby incorporated by reference.

BACKGROUND OF THE INVENTION

1. Field of the Invention

The present invention relates generally to a coupling structure of a variable length shaft used for a steering device etc of an automobile, and more particularly to a coupling structure of a variable length shaft capable of enhancing a workability when assembling the steering device into a vehicle and surely preventing a "backlash" from being caused after having incorporated the steering device.

2. Related Background Art

A steering device of an automobile is structured such that an intermediate shaft of a steering shaft is contractible upon a collision etc of the vehicle, thus protecting the driver. More specifically, the intermediate shaft of the steering shaft is spline- or serration-fitted to a pipe member provided posterior to the intermediate shaft, and when the collision happens, the intermediate shaft is retracted into the pipe member.

On such spline-fitting or the like, a "backlash" might occur to some extent between the intermediate shaft and the pipe member due to factors such as a limit of working accuracy etc.

Japanese Utility Model Post-Exam Publication No. 63-17862 discloses a structure for preventing the "backlash" described above, wherein an end of a pipe member is capable of expanding and diminishing in diameter in a radial direction by forming a plurality of slits in the end of the pipe member, an intermediate shaft is spline-fitted in this pipe member, thereafter a ring member is fitted to an outer periphery of the end of the pipe member, and the end of the pipe member is fastened against the intermediate shaft, thereby preventing the above "backlash".

Before assembling the steering device into the vehicle, however, as disclosed in the above Publication, if the "backlash" is prevented by previously fastening the end of the pipe member with the ring member, a slide frictional resistance in an axial direction between the intermediate shaft and the pipe member increases on the contrary, in assembling the steering device into the vehicle. This might lead to a difficulty of adjusting lengths of the intermediate shaft and the pipe member in the axial direction and to a decline of workability.

Under such circumstances, it is desired that the workability be enhanced, when assembling the steering device into the vehicle, by enabling the intermediate shaft to move in the axial direction along inside the pipe member, and the occurrence of the "backlash" be prevented with certainty after having assembled the steering device.

SUMMARY OF THE INVENTION

It is a primary object of the present invention, which was devised in view of the circumstances described above, to provide a coupling structure of a variable length shaft capable of enhancing a workability when assembling a steering device into a vehicle, and surely preventing an occurrence of the "backlash" after having assembled the steering device.

To accomplish the above object, a coupling structure of a variable length shaft comprises a pipe member having its end capable of expanding and diminishing in diameter by forming with a plurality of slits in the end thereof, an intermediate shaft spline-fitted in the pipe member, and a ring member fitted to an outer periphery of the end of the pipe member, the intermediate shaft being fastened by the outer periphery of the end thereof, wherein a holder is attached to an end of the ring member, a slide frictional resistance of the pipe member against the intermediate shaft is reduced by expanding a diameter of the ring member, the ring member, after assembled, diminishes in diameter by releasing the holder, and a fastening force of the pipe member on the intermediate shaft is increased with a fastening force of the ring member which acts with the diametrical reduction of the ring member.

Thus, according to the present invention, for example, when assembling the steering device into the vehicle, the holder is attached to the end of the ring member, and the slide frictional resistance of the pipe member against the intermediate shaft is reduced by expanding the diameter of the ring member. It is therefore possible to make the intermediate shaft slidable on the pipe member and enhance the workability when assembling.

While on the other hand, for example, after having incorporated the steering device into the vehicle, the holder is released, and the ring member diminishes in diameter. Then, the fastening force of the pipe member upon the intermediate shaft can be increased with the fastening force of the ring member which acts with the diametrical reduction thereof. It is therefore possible to surely prevent the "backlash" derived from factors such as a working accuracy of the spline fitting. Further, the holder is released simply by the finger of the worker without using a tool etc, thereby obtaining a high workability of releasing the holder.

BRIEF DESCRIPTION OF THE DRAWINGS

FIG. 1 is a vertical sectional view showing a coupling structure of an intermediate shaft in a steering device in a first embodiment of the present invention;

FIG. 2 is a sectional view taken along the line II—II in FIG. 1;

FIG. 15A is a side view of the ring member and the holder in a modified example of the fifth embodiment of the present invention;

FIG. 15B is a sectional view of FIG. 15A.

DETAILED DESCRIPTION OF THE EMBODIMENTS

Figure 3:
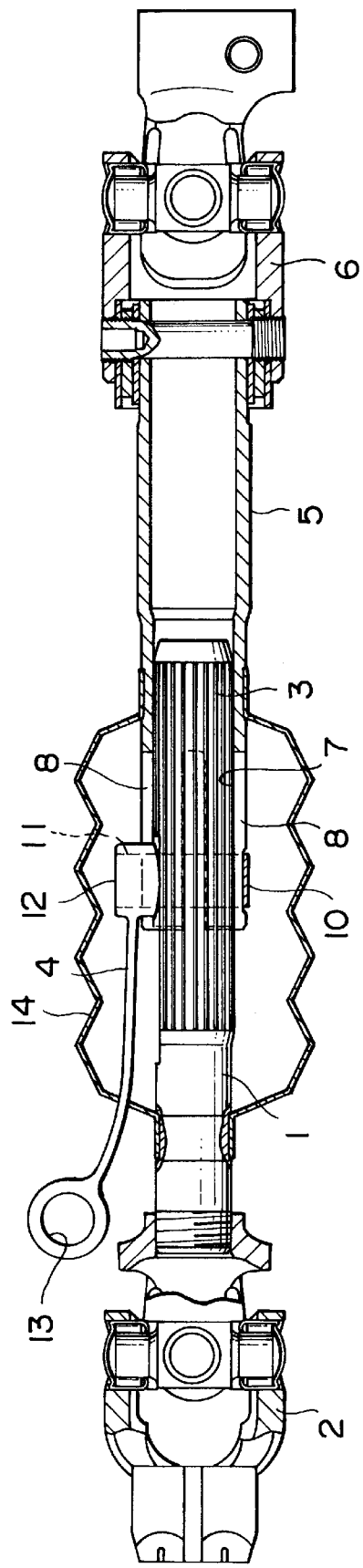
FIG. 3 is a vertical sectional view showing the coupling structure of the intermediate shaft in the steering device in a modified example of the first embodiment of the present invention.

A coupling structure of a variable length shaft in embodiments of the present invention will hereinafter be described with reference to the accompanying drawings.

FIG. 1 is a vertical sectional view showing a coupling structure of an intermediate shaft in a steering device of an automobile. FIG. 2 is a sectional view taken along the line II—II in FIG. 1.

As shown in FIG. 1, in a steering shaft of the steering device of the automobile, a universal joint 2 is connected to a front side end of an intermediate shaft 1, and a spline portion 3 formed with spline teeth (or serration teeth) is provided at a rear side end of the intermediate shaft 1. Further, an intermediate portion of the intermediate shaft 1 is notched 4, and both side edges of this notch 4 function as a stopper for a holder 12 which will be mentioned later on, thereby preventing a fallout (come-off) of the intermediate shaft 1.

A universal joint 6 is provided also at a rear side end of a pipe member 5 which spline-engages with the intermediate shaft 1. A spline portion 7 formed with the spline teeth (or the serration teeth) is provided also on an inner peripheral surface of a front side end of the pipe member 5. Further, a plurality of slits 8 (of which the number is 4 in FIG. 1) extending in the axial direction thereof are formed in the front side end of the pipe member 5, whereby the front side end of the pipe member 5 can expand and diminish in terms of its diameter in the radial direction.

A ring member 10 is fitted on an outer periphery of the end of the pipe member 5, and the end of the pipe member 5 is fastened against the intermediate shaft. The ring member 10 has a pair of flat plate edges 11, 11 open to the outside and is elastic enough to diminish itself in diameter. With this configuration, the ring member 10 enlarges a width between the pair of flat plate edges 11, 11 with the aid of the holder 12 which will be described later on, resisting the elasticity, and enlarges an inside diameter thereof. On the other hand, the ring member 10, when releasing the holder 12, reduces the inside diameter thereof by the elasticity of the member 10 itself while closing the spacing between the pair of flat plate edges 11, 11, thus pressing the pipe member 5 inwards in the radial direction.

In the first embodiment, the holder 12 is sandwiched in between the pair of flat plate edges 11, 11 and is, as will hereinafter be described, provided with a manipulation ring 13 for pulling out the holder 12 with a finger of the worker.

The mechanism being thus structured, when assembling the steering device into the vehicle, the holder 12 is sandwiched in between the pair of flat plate edges 11, 11 of the ring member 10, thereby enlarging the width between the pair of flat plate edges 11, 11. This brings the ring member 10 into a state where the ring member 10 expands in diameter resisting its own elasticity and does not press the pipe member 5 inwards in the radial direction, where a slide frictional resistance of the pipe member 5 against the intermediate shaft 1 can be reduced. It is therefore feasible to make the intermediate shaft 1 freely easily slide on the pipe member 5, and enhance the workability when assembling the intermediate shaft 1 into the automobile.

On the other hand, after having incorporated the steering device into the vehicle, the worker inserts the finger into the manipulation ring 13 from between the pair of flat plate edges 11, 11 of the ring member 10 and pulls this manipulation ring 13, thereby releasing the holder 12. As a result, the ring member 10 reduces the diameter thereof by the elasticity of the member 10 itself while closing the spacing between the pair of flat plate edges 11, 11, and a fastening force of the pipe member upon the intermediate shaft 1 can be increased with a fastening force of the ring member which acts with the above diametrical reduction. Hence, it is possible to surely prevent a "backlash" derived from factors such as a working accuracy of the spline fitting. Further, when releasing the holder 12, a load enough to resist the fastening force of the ring member 10 may suffice as the force for pulling out the holder, and therefore the holder 12 is drawn out simply by pulling the manipulation ring 13 with the worker's finger inserted into the ring 13 without using a tool etc, thereby obtaining a high workability of releasing the holder 12.

FIG. 3 is a vertical sectional view of a coupling structure of the intermediate shaft in the steering device, showing a modified example of the first embodiment of the present invention.

As illustrated in FIG. 3, in this modified example, for protecting the spline fitting portion between the intermediate shaft 1 and the pipe member 5, there is provided a boot 14 for protecting the spline fitting portion by covering it. Hence, the manipulation ring 13 is extended outside the boot 14.

Figure 4:
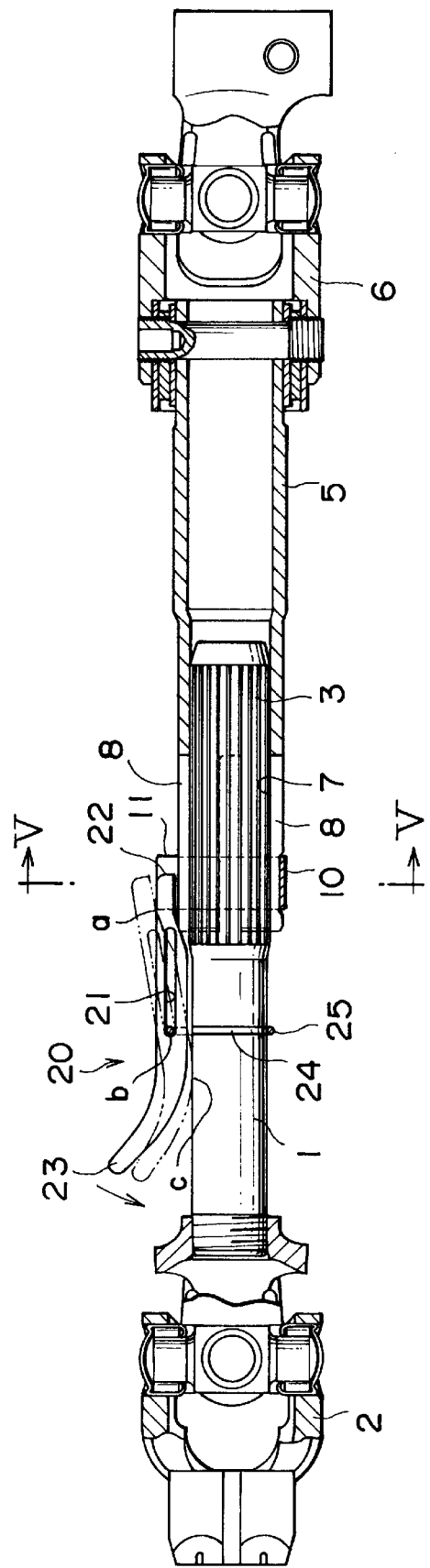
FIG. 4 is a vertical sectional view showing the coupling structure of the intermediate shaft in the steering device in a second embodiment of the present invention.
Figure 5:
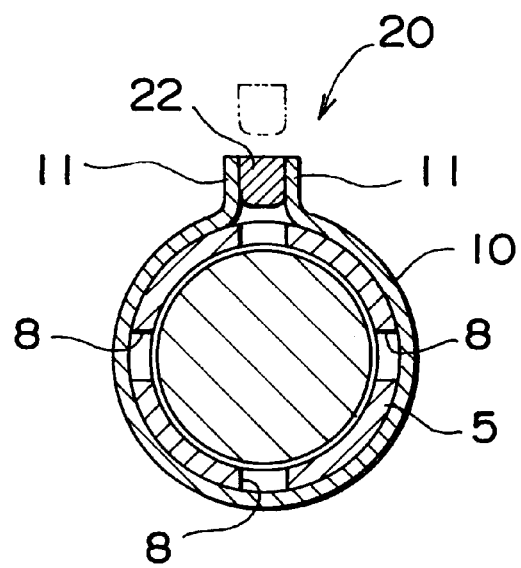
FIG. 5 is a sectional view taken along the line V—V in FIG.

FIG. 4 is a vertical sectional view showing a coupling structure of the intermediate shaft in the steering device in a second embodiment of the present invention. FIG. 5 is a sectional view taken along the line V—V in FIG. 4.

As shown in FIG. 4, a holder 20 acting as a "lever" is provided in the second embodiment, and a side end of this lever-like holder 20 is sandwiched in between the pair of flat plate edges 11, 11 of the ring member 10.

The lever-like holder 20 is provided with a first arm 22 formed with an elongate hole 21 through which a wire 25 which will be mentioned later on slides, and a second arm 23 serving as a manipulation member pressed by the worker to release the holder 20.

Moreover, a circumferential groove 24 formed in the intermediate shaft 1 is wound with one string of wire 25 exhibiting the elasticity, and this wire 25 engages with the elongate hole 21 of the first arm 22 described above.

With this configuration, when incorporating the steering device into the vehicle, the end of the first arm 22 of the holder 20 is sandwiched in between the pair of flat plate edges 11, 11 of the ring member 10, whereby the ring member 10 expands in diameter by enlarging the width between the pair of flat plate edges 11, 11. The slide frictional resistance of the pipe member 5 against the intermediate shaft 1 can be thereby reduced.

When incorporating, the intermediate shaft 1 slides on the pipe member 5. In this case, the intermediate shaft 1 may simply slide thereon while wire 25 slides along inside the elongate hole 21 of the first arm 22. Further, the fallout (come-off) of the intermediate shaft 1 can be prevented by engaging the wire 25 with the end of the elongate hole 21 of the first arm 22.

On the other hand, after having incorporated the steering device into the vehicle, the holder 20 is rotated as indicated by an imaginary line by rotating in an arrow direction the second arm 23 of the lever-like holder 20, thereby releasing the holder 20 from between the pair of flat plate edges 11, 11 of the ring member 10. With this release, the spacing between the pair of flat plate edges 11, 11 is closed, and the diameter of the ring member 10 is reduced. By dint of the fastening force of the ring member 10 which acts with its diametrical reduction, the fastening force of the pipe member 5 with respect to the intermediate shaft 1 can be enhanced, whereby the "backlash" can be surely prevented.

After having released the holder 20, it follows that the holder 20 is left in the vehicle in a state shown by the imaginary line even after completing the vehicle, however, it never happens that the "backlash" occurs in the holder 20 because of being pulled by the wire 25 and held at three points indicated by the reference letters a, b and c.

Further, if the intermediate shaft 1 is retracted into the pipe member 5 upon a collision of the vehicle, the wire 25 moves over the circumferential groove 24 toward the universal joint 24, and therefore the wire 25 is by no means bitten by the pipe member 5.

Moreover, the holder 20 can be released by a simple operation of the worker without using the tool etc, and a high workability of releasing the holder 20 is exhibited.

Figure 6:
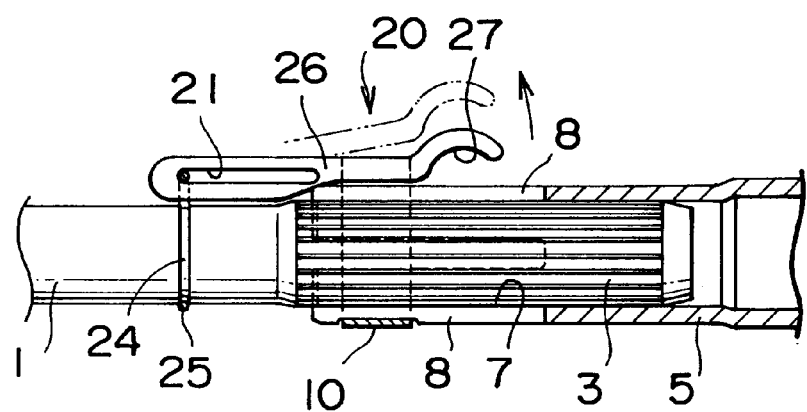
FIG. 6 is a vertical sectional view showing the coupling structure of the intermediate shaft in the steering device in a modified example of the second embodiment of the present invention.

FIG. 6 a sectional view of the principal portion of the coupling structure of the intermediate shaft in the steering device, showing a modified example of the second embodiment of the present invention.

As illustrated in FIG. 6, in this modified example, the elongate hole 21 is formed in an end portion of the lever-like holder 20, and there is provided an arm 26 sandwiched in between the pair of flat plate edges 11, 11 of the ring member 10. An end of this arm 26 is formed with a manipulation member 27 for the worker.

In this case also, the arm 26 can be released from between the pair of flat plate edges 11, 11 by rotating the holder 20 in an arrow direction. Other operations and effects are the same as those in the second embodiment.

Figure 7:
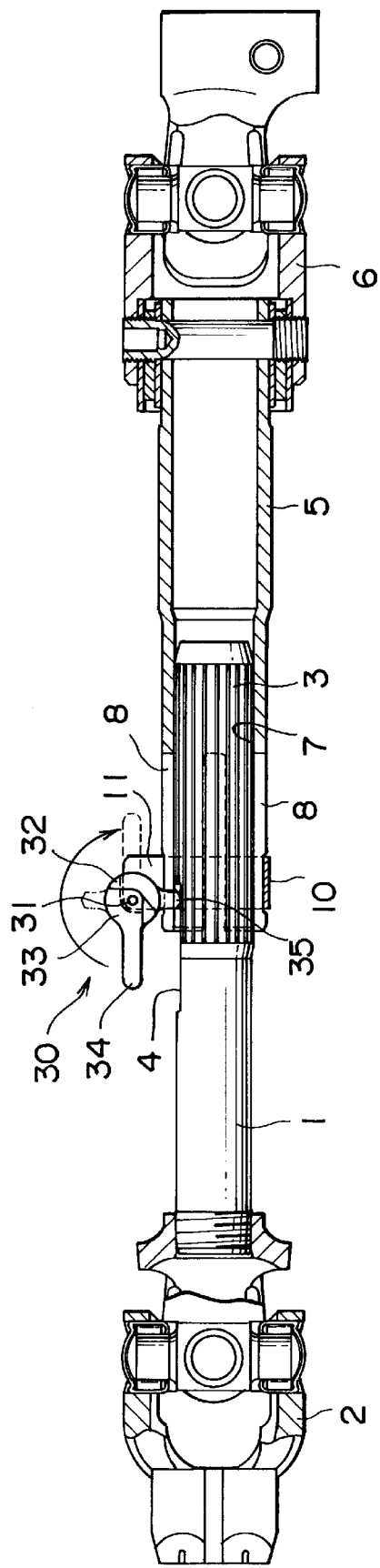
FIG. 7 is a vertical sectional view showing the coupling structure of the intermediate shaft in the steering device in a third embodiment of the present invention.
Figure 8:
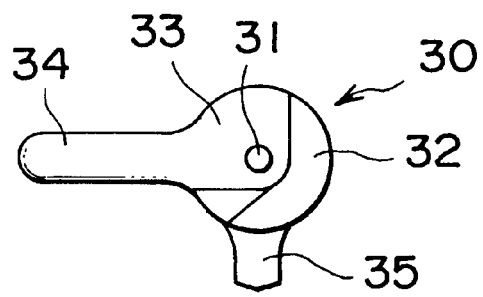
FIG. 8 is a side view showing a holder used for the coupling structure shown in FIG. 7.
Figure 9:
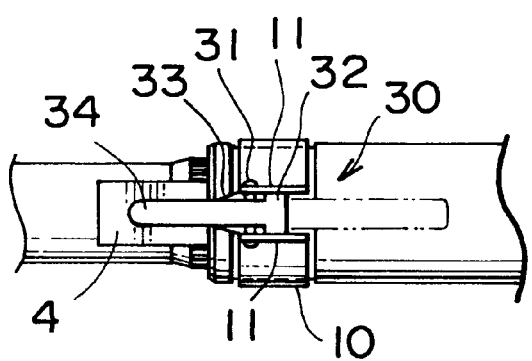
FIG. 9 is a plan view showing the principal portion of the coupling structure shown in FIG. 7.

FIG. 7 is a vertical sectional view illustrating the coupling structure of the intermediate shaft in the steering device in a third embodiment of the present invention. FIG. 8 is a side view showing the holder used in the coupling structure shown in FIG. 7. FIG. 9 is a plan view showing the principal portion of the coupling structure illustrated in FIG. 7.

As shown in FIG. 7, a disk-like holder 30 having a rotary structure is provided in the third embodiment. The holder 30 is so structured as to be rotatable about a rotary shaft 31. The disk-like holder 30 is provided with a wall-thick portion 32 taking a circular arc on one side of the rotary shaft 31, and a wall-thin portion 33 assuming the circular arc on the other side of the rotary shaft 31. A knob 34 extends from the wall-thin portion 33. A supporting portion 35 fitted into the slit 8 of the pipe member 5 is provided under the disk-like holder 30.

With this configuration, when assembling the steering device into the vehicle, the disk-like holder 30 is rotated, and the wall-thick portion 32 of the holder 30 is sandwiched in between the pair of flat plate edges 11, 11 of the ring member 10. Then, the ring member 10 expands in diameter by enlarging the width between the pair of flat plate edges 11, 11, whereby the slide frictional resistance of the pipe member against the intermediate shaft 1 can be reduced. It is therefore feasible to make the intermediate shaft 1 freely easily slide on the pipe member 5, and the workability when assembling can be enhanced.

On the other hand, after having incorporated the steering device into the vehicle, the disk-like holder 30 is rotated in the arrow direction, and the wall-thin portion 33 of the holder 30 is sandwiched in between the pair of flat plate edges 11, 11 of the ring member 10. As a result, the spacing between the pair of flat plate edges 11, 11 is closed, and the diameter of the ring member 10 is reduced. By dint of the fastening force of the ring member 10 which acts with its diametrical reduction, the fastening force of the pipe member 5 with respect to the intermediate shaft 1 can be enhanced, whereby the "backlash" can be surely prevented.

Further, the holder 30 is released simply by the worker's manipulating the knob 34 of the holder 30, and hence the high workability of releasing the holder 30 is obtained.

Figure 10:
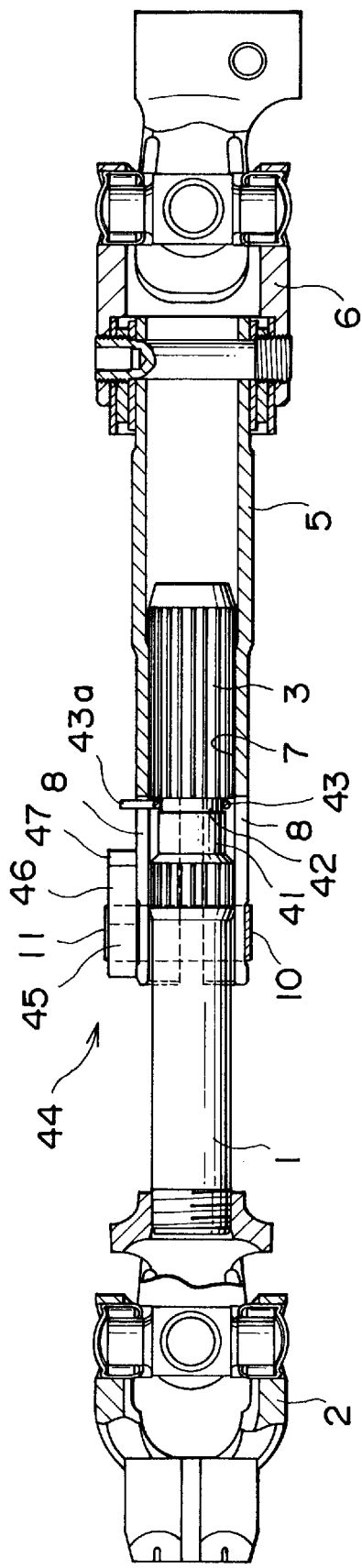
FIG. 10 is a vertical sectional view showing the coupling structure of the intermediate shaft in the steering device in a fourth embodiment of the present invention.
Figure 11:
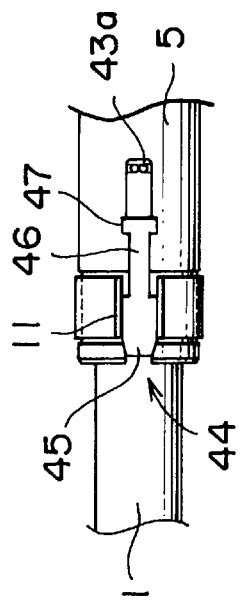
FIG. 11 is a plan view showing the principal portion of the coupling structure shown in FIG. 10.

FIG. 10 is a vertical sectional view showing the coupling structure of the intermediate shaft in the steering device in a fourth embodiment of the present invention. FIG. 11 is a plan view showing the principal portion of the coupling structure illustrated in FIG. 10.

As shown in FIG. 10, in the fourth embodiment, the intermediate portion of the intermediate shaft 1 is formed with a circumferential groove 41 sunk a step and also with a circumferential groove 42 sunk deeper than the groove 41. A wire 43 exhibiting the elasticity is fitted in the circumferential groove 42, and a tip 43a of the wire 43 is protruded upward.

Further, in accordance with the fourth embodiment, a slide-type holder 44 is sandwiched in between the pair of flat plate edges 11, 11 of the ring member 10. To be specific, the holder 44 includes a wall-thick portion 45 sandwiched in between the pair of flat plate edges 11, 11, a wall-thin portion 46 provided adjacent to the wall-thick portion 45, and an impinged portion 47 upon which the tip 43a of the wire impinges.

With this construction, when assembling the steering device into the vehicle, the wall-thick portion 45 of the slide-type holder 44 is sandwiched in between the pair of flat plate edges 11, 11 of the ring member 10, the ring member 10 expands in diameter by enlarging the width between the pair of flat plate edges 11, 11. It is therefore possible to reduce the slide frictional resistance of the pipe member 5 against the intermediate shaft 1, make the intermediate shaft 1 freely easily slide on the pipe member 5, and enhance the workability when assembling.

On the other hand, after having incorporated the steering device into the vehicle, the intermediate shaft 1 extends out of the pipe member 5, so that the wire tip 43a protruding upward from the intermediate shaft 1 impinges upon the impinged portion 47 of the slide-type holder 44, and the wall-thin portion 46 is sandwiched in between the pair of flat plate edges 11, 11 by pressing the holder 44. As a result, the spacing between the pair of flat plate edges 11, 11 is closed, and the diameter of the ring member 10 is reduced. By dint of the fastening force of the ring member 10 which acts with its diametrical reduction, the fastening force of the pipe member 5 with respect to the intermediate shaft 1 can be enhanced, whereby the "backlash" can be surely prevented.

Further, the holder 44 is released simply by the worker's pulling out the intermediate shaft 1, thereby obtaining the high workability of releasing the holder 44.

Moreover, if the intermediate shaft 1 is retracted into the pipe member 5 upon a collision etc of the vehicle, the wire tip 43a impinges on a proximal portion of the slit 8 of the pipe member 5 and is thereby bent into the circumferential groove 41, with the result that the intermediate shaft 1 is movable without any hindrance of its movement by the wire tip 43a.

Figure 12:
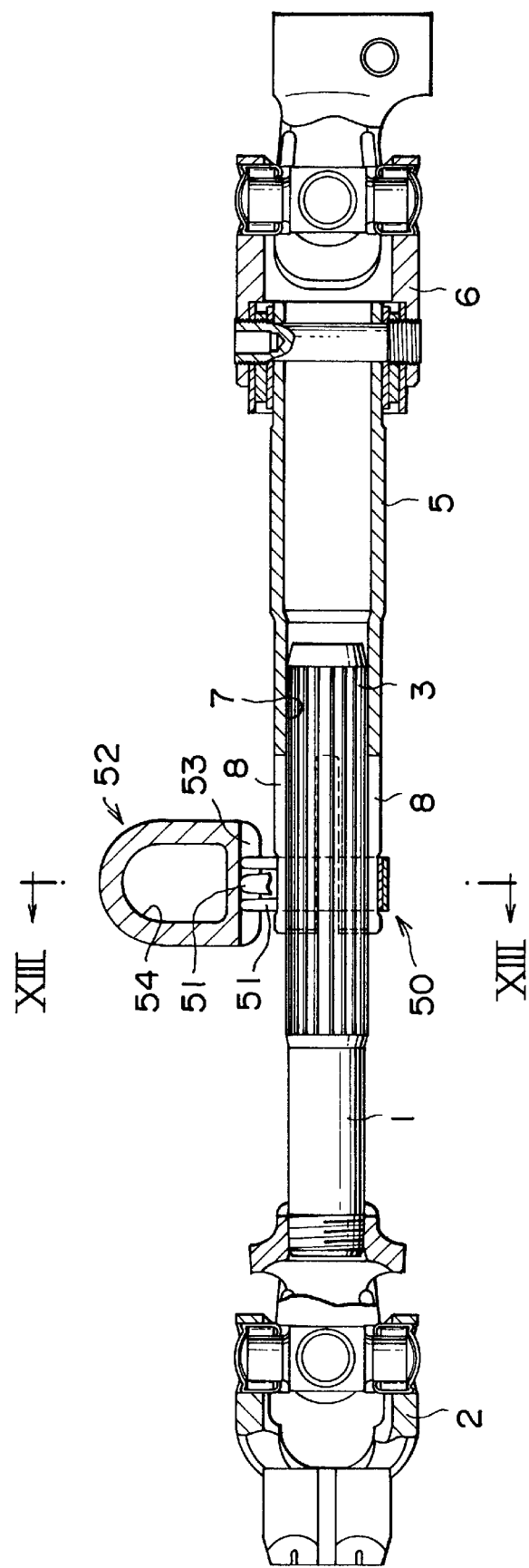
FIG. 12 is a vertical sectional view showing the coupling structure of the intermediate shaft in the steering device in a fifth embodiment of the present invention.
Figure 13:
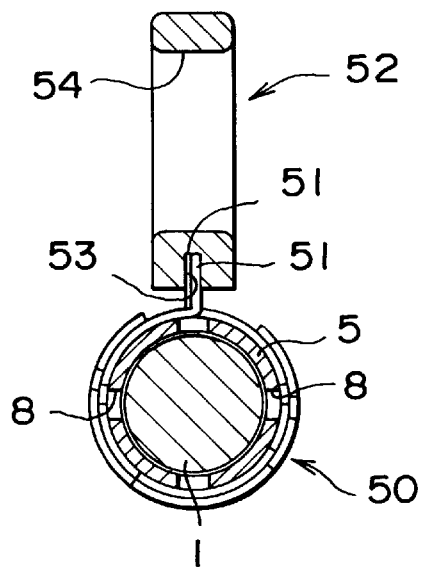
FIG. 13 is a sectional view taken along the line XIII—XIII in FIG. 12.
Figure 14A:
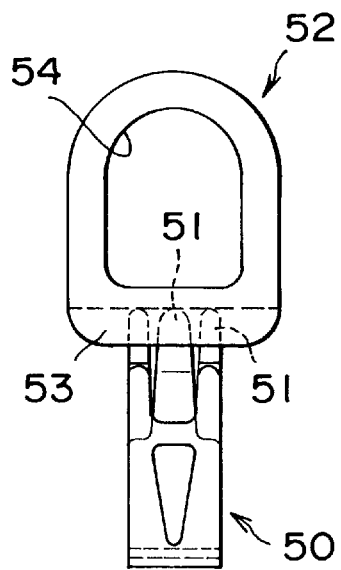
FIG. 14A is a side view showing a ring member and a holder shown in FIGS. 12 and 13.
Figure 14B:
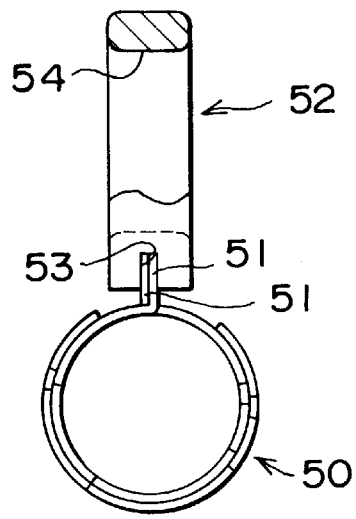
FIG. 14B is a sectional view of FIG. 15A.

FIG. 12 is a vertical sectional view showing a coupling structure of the intermediate shaft in the steering device in a fifth embodiment of the present invention. FIG. 13 is a sectional view taken along the line XIII—XIII in FIG. 12. FIG. 14A is a side view of the ring member and the holder shown in FIGS. 12 and 13. FIG. 14B is a sectional view thereof in FIG. 14A.

The point common to the first through fifth embodiments is that each of the ring members 10, 50 is elastic enough to reduce its diameter. In the first to fourth embodiments, however, the ring member 10 expands in diameter when enlarging the width between the pair of flat plate edges 11, 11 and diminishes in diameter when closing the spacing between the pair of flat plate edges 11, 11. By contrast, the fifth embodiment has such a difference that the ring member expands in diameter when closing the spacing between the pair of flat plate edges 11, 11 and diminishes in diameter when enlarging the width between the pair of flat plate edges 11, 11.

To be more specific, as shown in FIGS. 13 and 14B, a spacing between a pair of flat plate edges 51, 51 of a ring member 50 is closed, and an engagement recess 53 of a holder 52 which will hereinafter be explained engages with the pair of flat plate edges 51, 51, in which case the ring member 50 is a state of expanding in diameter resisting a biasing force of the ring member 50 itself. The ring member 50 does not press the pipe member 5 inwards in the radial direction, and hence the slide frictional resistance of the pipe member 5 against the intermediate shaft 1 can be decreased.

While on the other hand, when the engagement recess 53 of the holder 52 disengages from the pair of flat plate edges 51, 51 of the ring member 50, the pair of flat plate edges 51, 51 enlarge the width with the elasticity thereof, thereby pressing the pipe member 5 inwards in the radial direction. Consequently, the fastening force of the pipe member 5 upon the intermediate shaft 1 can be increased with the fastening force of the ring member 50 which acts with the above diametrical reduction.

Further, the holder 52 is an integral molding product involving the use of a resin, sintering and forging, and includes the engagement recess 53 engaging with the pair of flat plate edges 51, 51 of the ring member 50, and a manipulation ring 54 for pulling out the holder 52 with the finger of the worker.

With this configuration, when assembling the steering device into the vehicle, the spacing between the pair of flat plate edges 51, 51 of the ring member 50 is closed, and the engagement recess 53 of the holder 52 engages with the pair of flat plate edges 51, 51. This brings the ring member 50 into a state of expanding in diameter resisting the biasing force of the ring member 50 itself, and the ring member 50 does not press the pipe member 5 inwards in the radial direction, whereby the intermediate shaft 1 is capable of freely easily sliding on the pipe member 5, and the workability when assembling is enhanced.

While on the other hand, after having incorporated the steering device into the vehicle, the engagement recess 53 of the holder 52 disengages from the pair of flat plate edges 51, 51 of the ring member 50. With this disengagement, the pair of flat plate edges 51, 51 enlarge the width with the elasticity thereof, and the ring member 50 diminishes in diameter with the elasticity of the ring member 50 itself and thereby presses the pipe member 5 inwards in the radial direction. Consequently, the fastening force of the pipe member 5 upon the intermediate shaft 1 can be increased with the fastening force of the ring member 50 which acts with the diametrical reduction thereof. It is therefore possible to surely prevent the "backlash" derived from factors such as a working accuracy of the spline fitting. Further, when releasing the holder 52, a load enough to resist the fastening force of the ring member 50 may suffice as the force for pulling out the holder 52, and therefore the holder 52 is drawn out simply by pulling the manipulation ring 54 with the worker's finger inserted into the ring 54 without using a tool etc, thereby obtaining a high workability of releasing the holder 52.

FIG. 15A is a side view showing the ring member and the holder in a modified example of the fifth embodiment of the present invention. FIG. 15B is a sectional view thereof in FIG. 15A.

The holder 52 is a press formed integral product composed of a steel sheet, and has the engagement recess 53 engaging with the pair of flat plate edges 51, 51 of the ring member 50, and the manipulation ring 54 for pulling out the holder 52 with the finger of the worker.

Note that the holder defined as press formed product is, before being press-formed, provided with a fold-back piece 53a for forming the engagement recess 53 as indicated by the imaginary line in FIG. 15A. Further, an upper part of the manipulation ring 54 has a fold-back piece 54a formed by the press forming. Other configurations and operations are the same as those in the fifth embodiment.

Note that the present invention is not limited to the embodiments discussed above but may be modified in a variety of forms.

As discussed above, according to the present invention, for instance, when assembling the steering device into the vehicle, the holder is attached to the end of the ring member, and the ring member expands in diameter, thereby reducing the slide frictional resistance of the pipe member against the intermediate shaft. It is therefore feasible to make the intermediate shaft freely slide on the pipe member and enhance the workability when assembling.

While on the other hand, for example, after having incorporated the steering device into the vehicle, the holder is released, and the ring member diminishes in diameter. Then, the fastening force of the pipe member upon the intermediate shaft can be increased with the fastening force of the ring member which acts with the diametrical reduction thereof. It is therefore possible to surely prevent the "backlash" derived from factors such as a working accuracy of the spline fitting. Further, the holder is released simply by the finger of the worker without using a tool etc, thereby obtaining a high workability of releasing the holder.

What is claimed is:

1. A coupling structure of a variable length shaft, comprising:
   a pipe member having an end formed with a plurality of slits elongated in the axial direction to be capable of expanding and diminishing in diameter
   an intermediate shaft spline-fitted in the end of said pipe member; and
   a ring member fitted on an outer periphery of the end of said pipe member, said intermediate shaft being fastened by the end of said pipe member,
   wherein a holder is releasably attached to an end of said ring member to expand a diameter thereof and thereby reduce a slide frictional resistance of said pipe member against said intermediate shaft, and when said holder is released, said ring member diminishes in diameter, and a fastening force of said pipe member on said intermediate shaft is increased.

2. A coupling structure of a variable length shaft according to claim 1, wherein said holder is provided at an end thereof with a manipulation portion for manually releasing the holder from said ring member.

3. A coupling structure of a variable length shaft according to claim 2, wherein said manipulation portion is formed with a hole or hook.

4. A coupling structure of a variable length shaft according to claim 2, wherein said holder includes an end of a lever, and said manipulation portion is formed at the other end of the lever.

5. A coupling structure of a variable length shaft according to claim 1, wherein said holder includes a rotatable cam.

6. A coupling structure of a variable length shaft according to claim 1, wherein said holder is slideable in said slits in the axial direction of said pipe member.

* * * * *